United States Patent [19]

Meyer et al.

[11] 4,266,659
[45] May 12, 1981

[54] ACCUMULATING ROLLER CONVEYOR

[75] Inventors: Louis H. Meyer, Prospect; Ellsworth H. Collins, Louisville, both of Ky.

[73] Assignee: Interlake, Inc., Oak Brook, Ill.

[21] Appl. No.: 30,160

[22] Filed: Apr. 16, 1979

[51] Int. Cl.³ .............................................. B65G 13/06
[52] U.S. Cl. .................................... 198/781; 198/783; 198/790
[58] Field of Search ................ 198/781, 789, 790, 783

[56] References Cited

U.S. PATENT DOCUMENTS

| 3,199,657 | 8/1965 | Harrison | 198/781 |
| 3,232,415 | 2/1966 | Gotham | 198/781 |
| 3,942,338 | 3/1976 | Furlette et al. | 198/781 |
| 3,958,684 | 5/1976 | Garzelloni | 198/783 |
| 4,109,782 | 8/1978 | Nakai | 198/790 |

FOREIGN PATENT DOCUMENTS 1580051  8/1969  France ...................... 198/789

Primary Examiner—Joseph E. Valenza

Attorney, Agent, or Firm—Vogel, Dithmar, Stotland, Stratman & Levy

[57] ABSTRACT

An accumulating roller conveyor for conveying articles including a frame and a plurality of conveyor rollers, means rotatably supporting each conveyor roller on the frame and movable upwardly and rearwardly with respect thereto, each conveyor roller normally being positioned downwardly and forwardly with respect to the frame, a drive belt frictionally engaging the conveyor rollers for driving the same, the drive belt having a projection thereon of limited longitudinal extent disposed toward the conveyor rollers, stopping the movement of an article along the conveyor rollers causing the projection to move the conveyor rollers upwardly and rearwardly and out of contact with the remaining portions of the drive belt, and one-way clutch mechanism holding out of contact with the drive belt the conveyor rollers in contact with a stopped article in the upward and rearward positions thereof so long as the contacted article is stopped.

30 Claims, 12 Drawing Figures

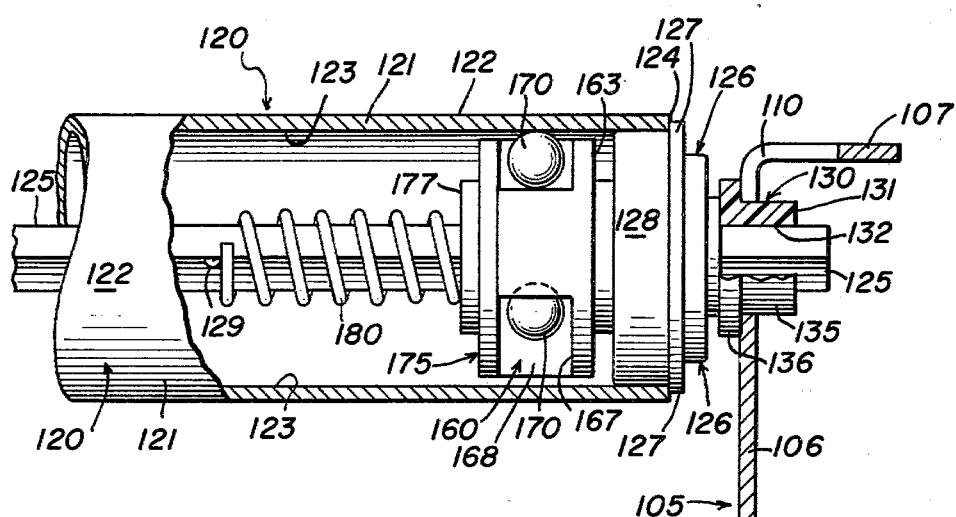
FIG. 8
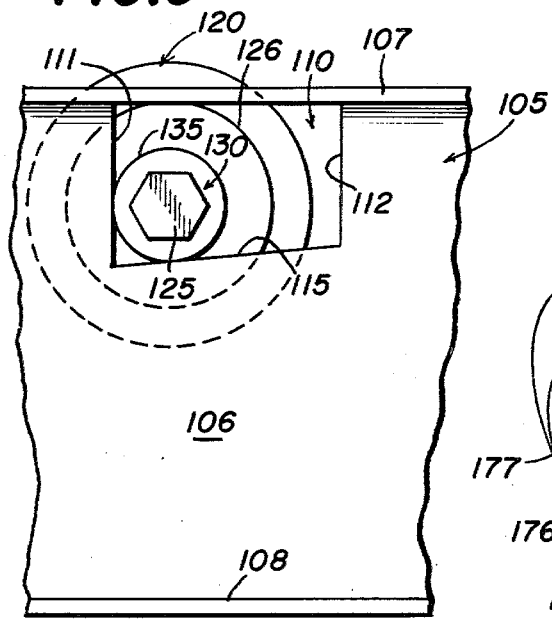
FIG. 9
FIG. 12
FIG. 10
FIG. 11

ACCUMULATING ROLLER CONVEYOR

PRIOR ART STATEMENT AND BACKGROUND OF THE INVENTION

The present invention relates generally to accumulating roller conveyors, and specifically to the provision of structure to minimize substantially the driving force applied to an article stopped with respect to the conveyor.

A typical prior art conveyor over which the present invention is an improvement is illustrated in U.S. Pat. No. 3,199,657 granted Aug. 10, 1965 to H. S. Harrison. That patent shows a conveyor formed of a plurality of conveyor rollers 30 mounted in slots 32 in a support plate 33, the slots 32 having a support surfaces 34 that are inclined upwardly and rearwardly with respect to the direction of travel of articles supported and conveyed by the rollers 30. The rollers 30 are contacted by a belt B which drives the rollers 30 in a direction to convey the supported articles in the direction indicated by the arrows. When the article being conveyed is stopped, the continued driving force of the belt B moves the rollers 30 upwardly along the support surfaces 34 to the left as viewed in FIG. 8 thereof so as to relieve the driving force applied between the belt B and the roller 30. This movement of the roller 30 up the inclined support surface 34 relieves the frictional drive of the belt B to about 10%, for example, of the weight of the article being conveyed. However, even with the driving force reduce only to 6% of its full driving value, this effect occurs beneath each article on the conveyor, whereby if there are ten hundred pound articles being accumulated, the driving force may be 60 lbs. total. The resultant driving force can crush fragile articles, or jackknife the loads, or if a roughened belt is employed at the end of the accumulating conveyor as a brake-type stop instead of an abutment as a positive stop, the driving force accumulated over several articles may overcome the braking action and cause the articles to travel further down the conveyor when they are supported to be stopped.

Another scheme for reducing the driving pressure between the conveyor rollers and the drive belt is illustrated in U.S. Pat. No. 4,109,782 granted Aug. 29, 1978 to I. Nakai. In this patent, the drive rollers 12 are mounted upon pivotal links 18 so that when an engaged article 36 is against the stop 40, the drive rollers 12 are pivoted in a clockwise direction about the pivot axis 38, thus to reduce the driving force transmitted by the drive rollers. This system also is subject to the same criticisms and objections as that discussed above with respect to the Harrison U.S. Pat. No. 3,199,657.

In U.S. Pat. No. 4,006,815 granted Feb. 8, 1977 to C. W. Werntz, an impositive drive or slip connection is provided between the drive for the conveyor rollers and the conveyor rollers. Such structures are objectionable in that a high degree of wear is encountered with a consequent requirement for continuous maintenance and replacement, as well as the fact that it is difficult to regulate the amount of slip and still insure good positive drive and good resumption of drive after a stopped article is released.

There have been provided heretofore accumulating conveyors wherein the drive belt driving the conveyor rollers has raised or thickened portions therein which serve to lift the conveyor rollers out of contact with the major portion of the drive belt when the conveyed article is stopped. Exemplars of such devices are illustrated in U.S. Pat. No. 3,650,376 granted Mar. 21, 1972 to W. J. Burgis, U.S. Pat. No. 3,730,330 granted May 1, 1973 to M. J. DeGood, and U.S. Pat. No. 3,958,684 granted May 25, 1976 to T. L. Garzelloni. Each of these devices is substantially more complicated than that of the present invention whereby to provide substantial maintenance and repair problems as well as lack of reliability in operation.

Even more complicated mechanisms have been provided in an effort to overcome the problems pointed out heretofore. Exemplars of such more complicated mechanisms are illustrated in U.S. Pat. No. 3,502,197 granted Mar. 24, 1970 to T. Kato et al., 3,716,129 granted Feb. 13, 1973 to A. C. Sadler, Jr., 3,810,538 granted May 14, 1974 to M. G. Moyes, 3,877,565 granted Apr. 15, 1975 to C. W. Werntz, and 3,905,470 granted Sept. 16, 1975 to R. Gebhardt. Each of these accumulating conveyors is so complicated that its reliability in operation is very low and maintenance and repair are excessive.

SUMMARY OF THE INVENTION

The present invention provides an accumulating roller conveyor which relieves substantially the entire driving force from a stopped article conveyed thereby, and reduces the driving force to no more than a small percentage of the weight of a single stopped article, this all being provided by a simple mechanical construction that is reliable in operation and requires substantially less maintenance and repair than such accumulating conveyors discussed hereinabove.

This is accomplished in the present invention, and it is an object of the present invention to accomplish these desired results, by providing an accumulating roller conveyor for conveying articles comprising a frame; a plurality of conveyor rollers, means rotatably supporting each conveyor roller on the frame with the axis of each conveyor roller extending transversely of the frame and movable upwardly and rearwardly with respect to the direction of travel the articles conveyed thereby, each of the conveyor rollers normally being positioned downwardly and forwardly with respect to the frame, means for frictionally engaging the conveyor rollers for driving the conveyor rollers to convey articles supported thereon, when the movement of an article along the conveyor rollers is stopped the contacted conveyor rollers move upwardly and rearwardly to substantially reduce the frictional engagement between the driving means and the conveyor rollers contacting the stopped article, and one-way clutch mechanism holding out of contact with the drive belt the conveyor rollers in contact with a stopped article in the upward and rearward positions thereof so long as the contacted article is stopped, forward movement of the stopped article permitting the contacting conveyor rollers to return to the downward and forward conveying positions thereof in full frictional engagement with the driving means.

Another object of the invention is to provide an accumulating roller conveyor of the type set forth wherein each conveyor roller includes a cylindrical drive sleeve supported by a longitudinal shaft extending therethrough and rotatably supporting the drive sleeve thereon, means rotatably supporting each conveyor roller shaft on the frame with the axis of each conveyor roller shaft extending transversely of the frame and movable upwardly and rearwardly with respect to the direction of travel of the articles conveyed thereby, the one-way clutch mechanism being engageable between each conveyor roller shaft and the associated conveyor roller sleeve to cause the shaft and the sleeve to rotate as a unit to hold out of contact with the drive belt the conveyor rollers in contact with a stopped article in the upward and rearward positions thereof as long as the contacted article is stopped.

Yet another object of the invention is to provide an accumulating roller conveyor of the type set forth wherein the frame has a plurality of opposed pairs of slots therein, each of the slots having a support surface extending upwardly and rearwardly with respect to the direction of movement of articles on the conveyor, the shaft of each conveyor roller being supported in an opposed pair of the slots and movable upwardly and rearwardly with respect to the direction of travel of the articles conveyed by the conveyor.

Still another object of the invention is to provide an accumulating roller conveyor of the type set forth wherein the drive means is a drive belt frictionally engaging the conveyor rollers for driving the conveyor rollers to convey articles thereon, the drive belt having a projection thereon of limited longitudinal extent disposed toward the conveyor rollers, stopping movement of an article along the conveyor rollers causing the projection to move the contacted conveyor rollers upwardly and rearwardly and out of contact with the remaining portions of the drive belt to remove engagement between the drive belt and the conveyor rollers contacting the stopped article except for the projection.

Further features of the invention pertain to the particular arrangement of the parts of the accumulating roller conveyor, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 8 is a fragmentary enlarged view, partly in section, showing the construction of one of the conveyor rollers forming a part of the conveyor of the present invention;

FIG. 9 is an end view of the conveyor roller of FIG. 8;

FIG. 10 is a view in section illustrating the positions of the parts of the one-way clutch in the non-clutching positions thereof;

FIG. 11 is a view similar to FIG. 10 and showing the one-way clutch with the parts in the clutching positions thereof; and FIG. 12 is an enlarged exploded view of the parts forming the one-way clutch that is a part of the accumulating roller conveyor of the present invention.

DESCRIPTION OF THE PREFERRED EMBODIMENT

Figure 1:
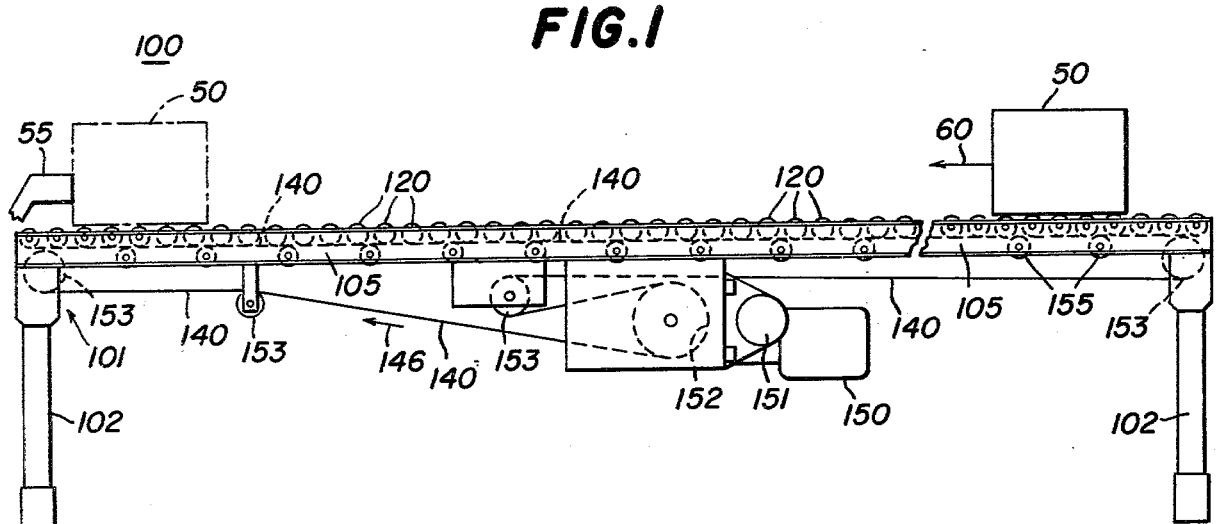
FIG. 1 is a side elevational view of an accumulating roller conveyor made in accordance with and embodying the principles of the present invention.

Referring to FIG. 1 of the drawings, there is shown an accumulating roller conveyor 100 made in accordance with and embodying the principles of the present invention and designed to carry and convey articles or loads 50 from the right in FIG. 1 toward the left in FIG. 1 in the direction of the arrow 60 and eventually against a positive stop 55. When a plurality of the articles 50 are in abutting relationship against one another with the leading article 50 against the stop 55, it is desired that a minimum of driving force be applied to the articles 50 by the conveyor 100 so as to protect fragile article 50 from damage and to prevent jackknifing of contacting articles 50.

Figure 3:
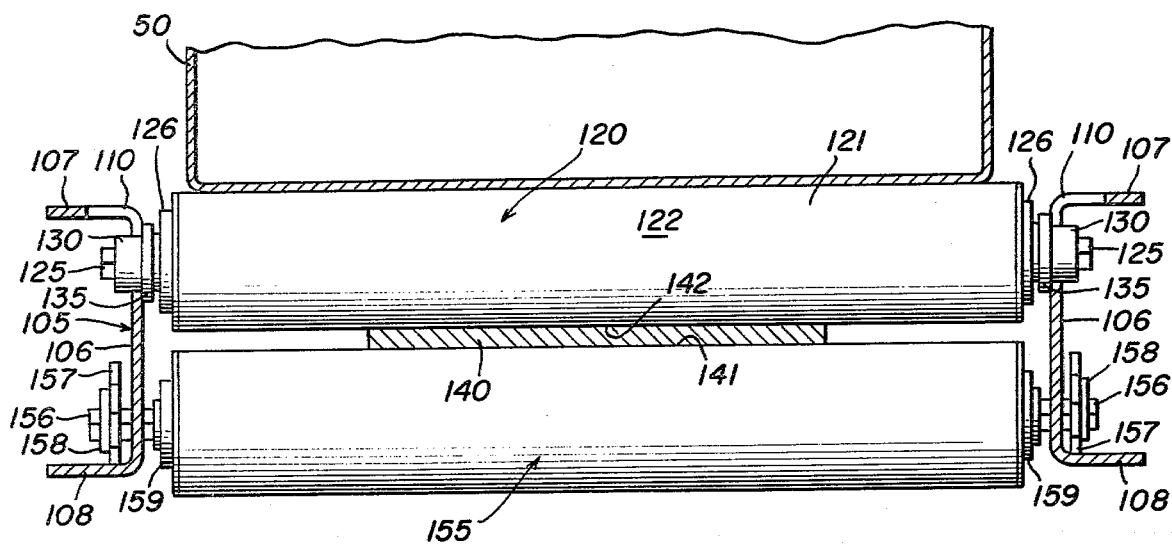
FIG. 3 is a view in vertical section along the line 3—3 of FIG. 2.

The accumulating roller conveyer 100 includes a frame 101 having four legs 102 supporting two spaced-apart longitudinal side members 105. The details of construction of the side members 105 are best illustrated in FIGS. 3 and 9 where it will be seen that each side member 105 includes a vertical wall 106 having an upper flange 107 disposed substantially normal thereto and a lower flange 108 also disposed substantially normal thereto and parallel to the upper flange 107. A plurality of equidistantly spaced and horizontally aligned slots 110 are formed in the two longitudinal side members 105. Referring to FIG. 9, each of the slots 110 has an essentially vertical leading edge 111 and an essentially vertical trailing edge 112, the lower ends of the edges 111 and 112 being connected by an inclined support surface 115. The support surface 115 is inclined upwardly and rearwardly, i.e., to the right as viewed in FIG. 1 and opposite to the direction of travel of the articles 50, the angle of inclination of the support surface 115 with respect to the horizontal being about 5°. Instead of a straight support surface 115, a curved surface starting at 5° and levelling off at the upper end thereof may be used.

Disposed in laterally aligned slots 110 are respectively conveyor rollers 120, the details of which are best illustrated in FIGS. 3 and 8 of the drawings. More specifically, each conveyor roller 120 includes a cylindrical sleeve 121 having a cylindrical outer surface 122 and a cylindrical inner surface 123, the surfaces 122 and 123 terminating at ends 124. Each sleeve 121 is supported upon a hexagonal shaft 125 that extends through the associated sleeve 121 with the longitudinal axes thereof in alignment, a ball bearing assembly 126 being disposed in each end of the sleeve 121 and receiving the associated hexagonal shaft 125 therethrough and in supporting relationship therewith. Each of the ball bearing assemblies 126 has an outwardly extending flange 127 that abuts against the adjacent end 124 of the sleeve 121, the housing 128 of the ball bearing assembly 126 being snugly received within the adjacent end of the sleeve 121 and held by the inner surface 123 thereof.

Each end of the hexagonal shaft 125 extends through an associated slot 110 in the adjacent longitudinal side member 105 to be supported within the slot 110. In order to facilitate the movement of the hexagonal shaft 125 within the associated slot 110 in a smooth and quiet manner, there is provided on each end of the hexagonal shaft 125 a slide member 130, preferably formed of plastic or pressed powdered metal. Each slide member 130 has a cylindrical body 131 with a centrally disposed hexagonal opening 132 therein that easily receives the associated end of the hexagonal shaft 125 therethrough. The cylindrical body 131 has a smooth cylindrical outer surface 135 and an outwardly extending flange 136 which guides against the inner surface of the vertical wall 106 of the associated longitudinal side member 105. The slide members 130 easily support the hexagonal shafts 125 in the associated slots 110 and accommodate quiet and easy rolling movement along the inclined support surfaces 115. In this manner, the conveyor rollers 120 are mounted with the upper surfaces thereof disposed above the adjacent upper flange 107 on the side members 105 so as to support thereon the articles 50.

Figure 2:
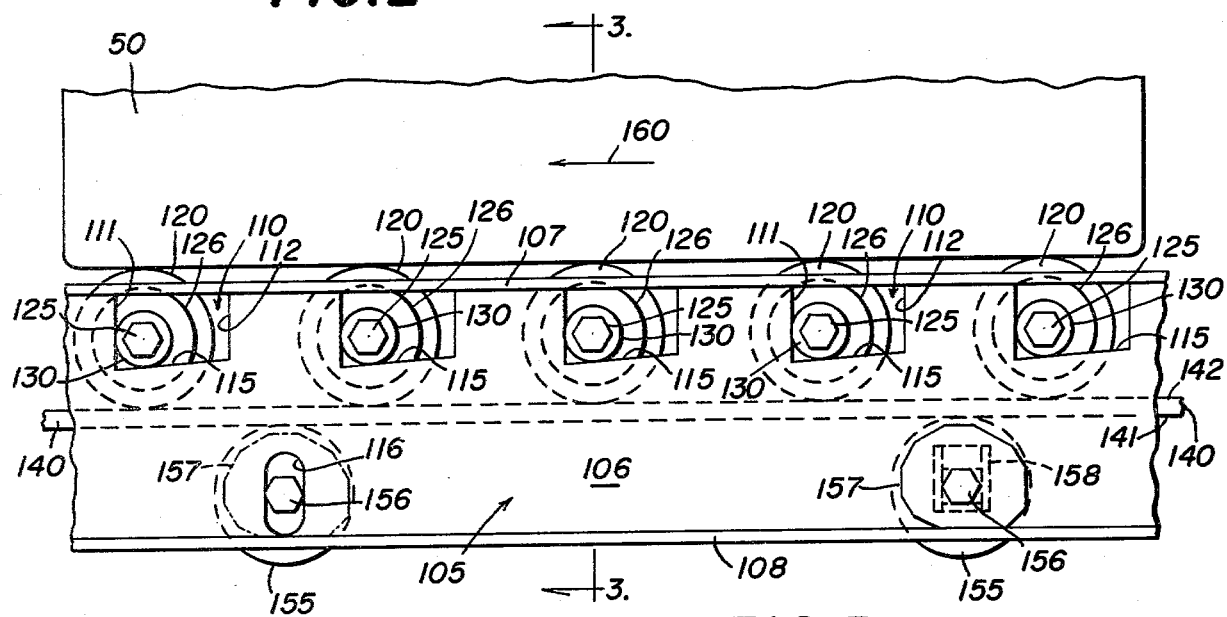
FIG. 2 is a fragmentary side elevational view on an enlarged scale showing the supporting of an article to be conveyed upon the conveying rollers of the conveyor of FIG. 1.

The conveyor rollers 120 are used to drive the articles 50 from the right to the left as viewed in FIG. 1 in the direction of the arrow 60. The conveyor rollers 120 in turn are driven by a drive belt 140 which is endless in character and has an inner surface 141 and an outer driving surface 142. Also disposed on the drive belt 140 is a projection or thickened portion 145, see FIG. 5; the length of the projection 145 is made as short as possible and as illustrated is about equal to the approximate length of articles 50 to be conveyed by the conveyor 100. The belt driving surface 142 is in contact with the lower portions of the conveyor rollers 120 when the conveyor rollers 120 are in the forward and downward positions thereof within the slots 115 as illustrated in FIG. 2, and is out of contact therewith when the conveyor rollers are in the upward and rearward positions thereof as illustrated in FIG. 6. When the parts are in the positions of FIGS. 5 and 6, only the projection or thickened portion 145 can contact the conveyor rollers 120.

In order to drive the belt 140 in the direction of the arrows 146, a drive motor 150 has been provided that drives a gear box 151 and has as an output a drive pulley 152. The drive belt 140 wraps partially around the drive pulley 152 and is driven thereby. A plurality of idler rollers 153 is provided so that the drive belt 140 can be continuously driven with the upper reach thereof below the conveyor rollers 120 moving from left to right as viewed in FIG. 1 so as to cause the contacted conveyor rollers 120 to be rotated in a counterclockwise direction and thus convey the articles 50 in the direction of the arrow 60.

In order to improve the contact between the driving surface 142 of the drive belt 140 and the contacted conveyor roller sleeves 121, a plurality of support idler rollers 155 have been provided mounted on the longitudinal side members 105, see FIGS. 2 and 3 particularly. Pairs of elongated slots 116 are provided in the side members 105, the slots in each pair being laterally aligned and disposed with the longitudinal axes thereof essentially vertical. Each support roller 155 has a hex shaft 166 extending therethrough and supported by ball bearing assemblies 159 at each end thereof. The ends of the hex shaft 156 extend through the adjacent ones of the elongated slots 116 and each carries thereon an adjusting cam plate 157 (see FIG. 2 particularly) having flat surfaces disposed different distances from the center thereof so as to adjust the vertical position of the hex shaft 156 with respect to the lower flange 108 on the associated side member 105. A retaining fastener 158 is provided to hold the adjusting cam plate 157 on the hex shaft 156, gravity serving to hold the adjusting cam plate 157 in the adjusted position thereof. The adjusting cam plates 157 are arranged so that the upper surface of the support idler roller 155 bears against the inner surface 141 of the drive belt 140 between adjacent conveyor rollers 120, thus to urge the drive belt 140 into driving relationship with the conveyor rollers 120 when the conveyor rollers 120 are in the downward and forward positions thereof within the slots 110.

An important part of the present invention is the provision of a one-way clutch 160 for each of the conveyor rollers 120, the construction of the clutch 160 being best illustrated in FIGS. 8 and 10–12. There is provided a clutch member or center core 161 which is generally cylindrical in shape and having a generally cylindrical outer surface 162 disposed between an outer face 163 and an inner face 164. There is provided centrally of the clutch member 161 a hexagonal opening 165 that receives the associated hexagonal shaft 125 therethrough. Formed in the cylindrical surface 162 thereof are three equiangularly arranged recesses 166 each of which receives therein a ball 170, each recess 166 being part circular in section so as readily to receive the associated ball 170 therein. Each recess 166 is defined on one side by an outer wall 167 and the lower portion of each recess 166 has an integral ramp 168 extending outwardly to the cylindrical surface 168, the ramps 168 accommodating the rolling movement of the associated ball 170 therealong and outwardly with respect to the outer surface 162 of the clutch member 161. The balls 170 are held within the recesses 166 by a retainer plate 175 having one surface adapted to be pressed against the inner surface 160 on the clutch member 161 and having an inner surface 177 disposed away therefrom. Disposed centrally of the retainer plate 175 is a hexagonal opening 176 to receive an associated hexagonal shaft 125 therethrough. As is best illustrated in FIG. 8, the clutch member 161 is disposed inwardly or to the left of an associated ball bearing assembly 126 with the surface 163 pressed thereagainst. The balls 170 are trapped in the recesses 166 by the associated sleeve 121, the balls 170 being more specifically restrained by the inner surface 123 thereof. The retainer plate 175 abuts against the left-hand end of the clutch member 161 and is held in that position by a spring 180 under compression having one end disposed against the inner surface 177 of the retainer plate 175 and the other end disposed against a projection 129 on the hexagonal shaft 125.

The one-way clutch 160 comes into operation when one of the articles 50 contacts the positive stop 55, whereby continued operation of the belt 140 driving the conveyor rollers 120 tends to move the conveyor rollers 120 up the inclined surfaces 115, the conveyor rollers 120 being positioned in the uppermost and rearwardmost portions of the slots 110 after contact by the projection 145 on the belt 140. So long as the sleeve 121 of the conveyor roller 120 is rotating in a counterclockwise direction as viewed in FIG. 2 (clockwise direction as viewed in FIG. 10) and in the direction of the arrows 137 to convey an article 50 in the direction of the arrow 60 in FIG. 1, the balls 170 are retained in the recesses 166 and thus permitting the sleeve 121 to rotate freely with respect to the hexagonal shaft 125. As soon as the conveyor rollers 120 reach the uppermost and rearwardmost portion of the slots 110, any tendency of the sleeve 121 to rotate in a clockwise direction as viewed in FIG. 2 (a counterclockwise direction as viewed in FIG. 11, i.e., in the direction of the arrow 187), moves the balls 170 out of the recesses 166 and against the inner surface 123 of the associated sleeve 121 so as to press and wedge the balls 170 between the ramps 168 and the inner surface 123, thus to lock the sleeve 121 with respect to the clutch member 161 and the attached shaft 125. All of the parts of the conveyor roller 120 now are locked together and move as a unit. As a consequence, so long as the sleeve 121 is in contact with the stopped article 50, the conveyor roller 120 will be held and maintained in the uppermost and rearmost portion of the slot 110 and out of contact with the driving surface 142 of the drive belt 140 and only in occasional contact with the upper surface of the projection 145 on the drive belt 140. The result is that the only driving force applied to a line of contacting articles 50 with the lead article 50 disposed against the positive stop 55 is the driving force generated as the projection 145 passes one-by-one beneath each of the articles 50, whereby there is no accumulation of driving forces from article 50 to article 50, and the maximum driving force on any article 50 is a small percentage of the weight of the article 50 alone.

The overall operation of the accumulating roller conveyor 100 will now be described with particular reference to the diagrammatic FIGS. 4 to 7 of the drawings. Before any articles 50 are conveyed thereby, the conveyor rollers 120 are disposed in the lowermost and forwardmost portions of the slots 110, i.e., to the left on the lowermost portions of the support surfaces 115 as viewed in FIG. 4. The drive belt 140 is being continuously driven via the drive motor 150, the gear box 151 and the drive wheel 152 so that the upper reach of the drive belt 140 is moving from left to right in the direction of the arrow 146 in FIG. 4. The inner surface 141 of the drive belt 140 is being supported along the upper reach thereof by the support idler rollers 155, whereby the driving surface 142 of the belt 140 is in firm driving contact with the outer surface 122 with the sleeves 121 of the rollers 120 at the lower portions thereof, the contact between the drive belt 140 and the sleeves 121 being frictional in character. It will be appreciated that the support idler rollers 155 have been adjusted by means of the adjusting cam plates 157 so as to provide the proper frictional drive contact between the driving surface 142 of the drive belt 140 and the sleeves 121 of the conveying rollers 120. With the drive belt 140 moving in the direction of the arrows 146, the support idler rollers 155 are rotated in a clockwise direction as indicated by the arrows 147, while the conveyor rollers 120 are rotated in a counterclockwise direction as indicated by the arrows 137.

Figure 4:
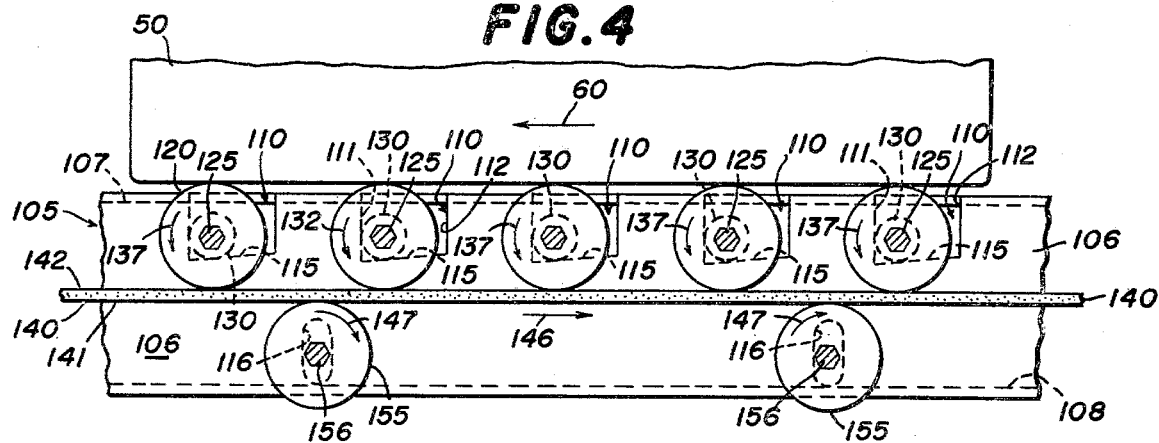
FIGS. 4 to 7 are diagrammatic views illustrating the method of operation of the conveyor when an article being conveyed thereby engages a positive stop and is thereafter released.

When an article 50 is placed upon the conveyor rollers 120, the upper portions of the sleeves 121 of the conveyor rollers 120 contact the lower surface of the article 50, and since the conveyor rollers 120 are rotating in a counterclockwise direction as indicated by the arrows 137, the article 50 will be conveyed from right to left in FIG. 4 as indicated by the arrow 60. The article 50 is conveyed the length of the conveyor 100 and ultimately arrives at the positive stop 55 disposed to the left as viewed in FIG. 1 and disposed to the left as viewed in FIGS. 5 and 6. Upon reaching the positive stop 55, the article 50 stops, but the rollers 120 continue to be contacted by the driving surface 142 on the drive belt 140. Since the upper portion of the sleeve 121 of each of the conveyor rollers 120 contacting the stopped article 50 are also stopped, and since the driving surface 142 of the drive belt 140 continues to urge to the right the lower portions of the sleeves 121 of the conveyor rollers 120 contacting the stopped article 50, the conveyor rollers 120 will be urged rearwardly and upwardly along the inclined support surfaces 115. When the projection 145 reaches the conveyor rollers 120 contacting the stopped article 50, the projection 145 will complete such movement of the conveyor rollers 120 and will move the conveyor rollers 120 contacting the stopped article 50 to the positions illustrated in FIG. 5.

Should the rollers 120 attempt to roll down the inclined support surface 115, the parts will be moving in the direction indicated by the arrow 187 in FIG. 11, and as a consequence, the one-way clutch 160 will be operated to the clutching position of the parts thereof as viewed in FIG. 11 so as to lock the sleeve 121 and the clutch member 161 and the shaft 125 as a unit. Therefore, so long as the sleeve 121 is in contact with the stopped article 50, the support roller 120 will be maintained in the rearward and upward position thereof within the slot 110, and more specifically in the position illustrated in FIGS. 5 and 6.

Figure 5:
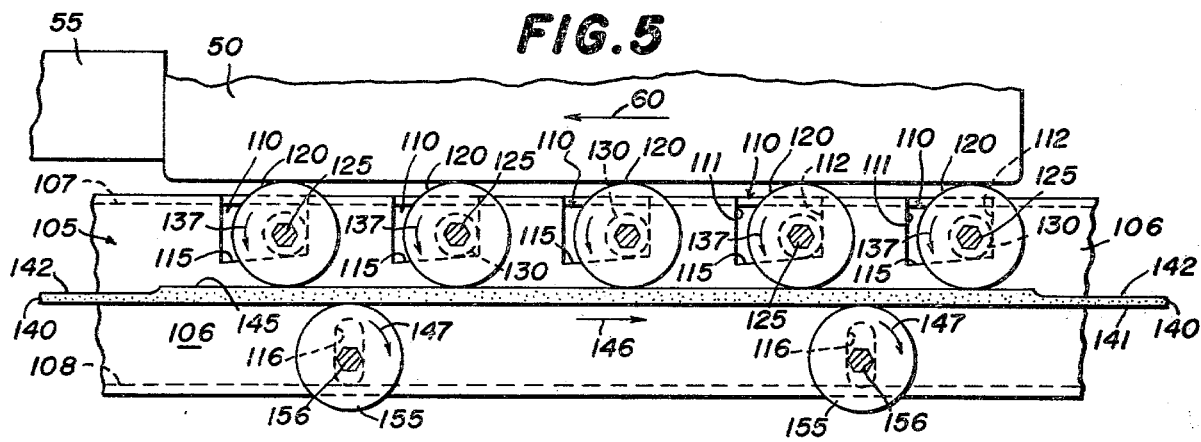
Figure 6:
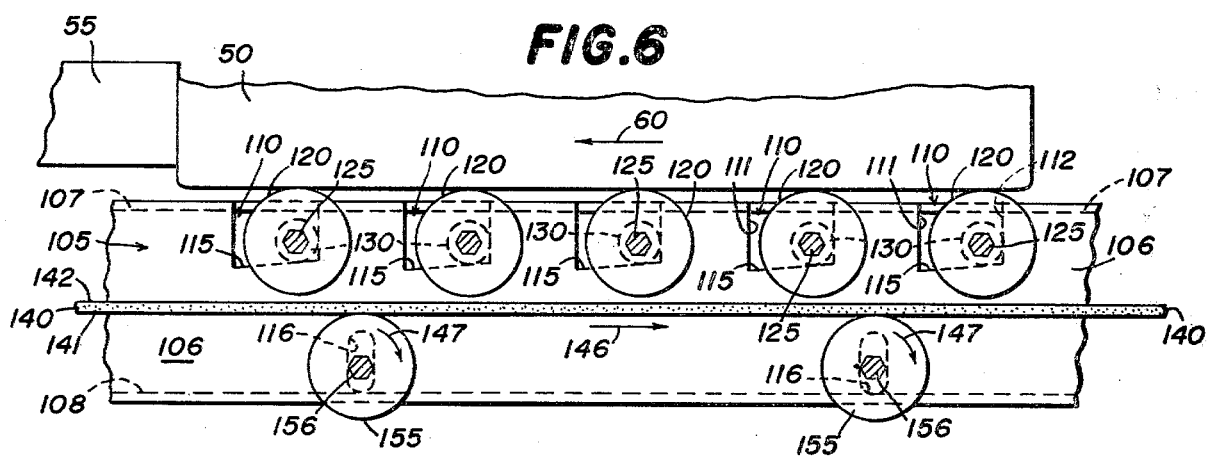

With the parts in the position of FIGS. 5 and 6, and with the one-way clutches 160 of the conveyor rollers 120 in contact with the stopped article 50 being in the operative clutching positions thereof, the conveyor rollers 120 will be held in the upwardmost and rearwardmost portions of the slots 110 with the outer surfaces 122 of the sleeves 121 contacting the stopped article 50 completely out of contact with the driving surface 142 of the drive belt 140. Therefore, when the driving surface 142 is beneath the locked conveyor rollers 120 as illustrated in FIG. 6, there will be no drive contact whatsoever with the conveyor rollers 120 and no driving forces applied by the conveyor rollers 120 to the stopped load 50. There will be a small driving force applied to the load 50 by the conveyor rollers 120 in contact therewith when the projection 145 is in contact with the conveyor rollers 120 as viewed in FIG. 5, but this driving force will only be a fraction of the weight of the article 50, and may be, for example, in the order of 5% to 6% of the weight of the article 50.

In the construction of the drive belt 140, the projections 145 thereon are spaced apart a distance such that only one of the projections 145 is present along the upper reach of the drive belt 140 at any one time. For example, there may be only one projection 145 on the drive belt, or perhaps two projections 145 disposed equidistantly apart, and in any event, the projections 145 are spaced so that only one projection 145 can be along the upper reach of the drive belt 140 at any time. As a consequence, only a very minor driving force can be applied even to a long string of articles 50 abutting one another with the lead article 50 against the positive stop 55. This is because the projection 145 can be in contact at one time only with two groups of conveyor rollers 120 contacting two stopped articles 50, and then only having an effective driving force equal to a few percent of the weight of a single article 50. In other words, there is no accumulation of driving forces along a string of stopped articles 50, and thus there is no driving force that can injure fragile articles 50 or cause jackknifing of adjacent articles 50 in a string thereof.

Figure 7:
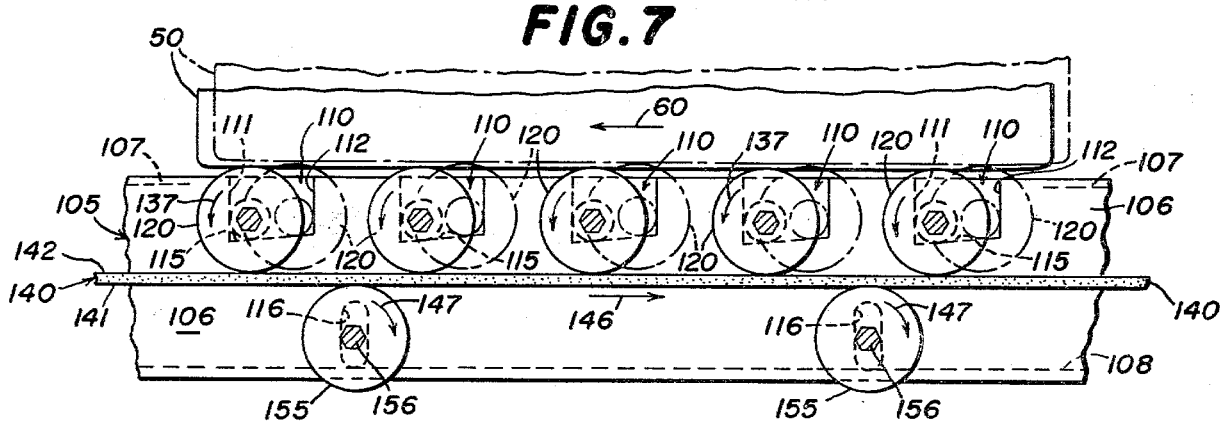

After the desired group of articles 50 has been accumulated behind the positive stop 55, the positive stop 55 is removed and there is created the condition of FIG. 7 wherein the stopped article 50 has the position thereof indicated in dashed lines and the released article 50 resuming conveying along the conveyor 100 has the position thereof indicated in solid lines. More specifically, the conveyor rollers 120 with the one-way clutches 160 engaged roll down the inclined surfaces 115 of the associated slots 110 from the dashed line positions thereof to the solid line positions thereof and thus into contact with the driving surface 142 of the drive belt 140. The parts now operate in a normal manner with the sleeves 121 of the contacting conveyor rollers 120 being moved in the direction of the arrows 137, thus to disengage the one-way clutches 160 as illustrated in FIG. 10. The operation of the accumulating roller conveyor 100 now proceeds in the normal fashion so as to convey the articles 50 from right to left and in the direction of the arrow 60 in FIG. 7. Once the positive stop 55 is removed, the entire accumulated line of articles 50 starts being conveyed immediately in the same direction and in unison.

It will be appreciated that the accumulating roller conveyor 100 is of simple construction and entirely mechanical in action, whereby it will require a minimum of maintenance and repair during usage. The action is very quiet because the drive belt 140 is formed of rubber or plastic which provides quiet operation thereof. The slide members 130 are formed of plastic or pressed powdered metal to provide for good lubricity and quiet action, and the clutch member 160 and the retainer plate 165 are also preferably formed of plastic, while the balls 170 may be formed of nylon or hard rubber, so as to provide for very quiet operation thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An accumulating roller conveyor for conveying articles comprising a frame, a plurality of conveyor rollers, means rotatably supporting each conveyor roller on said frame with the axis of each conveyor roller extending transversely of said frame and movable upwardly and rearwardly with respect to the direction of travel of the articles conveyed thereby, each of said conveyor rollers normally being positioned downwardly and forwardly with respect to said frame, means for frictionally engaging said conveyor rollers for driving said conveyor rollers to convey articles supported thereon, when the movement of an article along said conveyor rollers is stopped the contacted conveyor rollers move upwardly and rearwardly substantially to reduce the frictional engagement between said driving means and said conveyor rollers contacting the stopped article, and one-way clutch mechanism holding out of contact with said driving means the conveyor rollers in contact with a stopped article in the upward and rearward positions thereof so long as the contacted article is stopped by preventing said rotatable support means from rotating relative to said stopped conveyor rollers, forward movement of the stopped article permitting the contacting conveyor rollers to return to the downward and forward conveying positions thereof in full frictional engagement with said driving means.

2. The accumulating roller conveyor set forth in claim 1, wherein said means rotatably supporting each conveyor roller comprises an opposed pair of slots in said frame, each of said slots having a surface inclined upwardly and rearwardly with respect to the direction of conveying of said conveyor, and each of said conveyor rollers having a shaft extending therefrom and into bearing engagement with the inclined surfaces of one of said pairs of slots.

3. The accumulating roller conveyor set forth in claim 2, wherein said upwardly and rearwardly inclined surfaces are inclined at an angle of about 5° with respect to the horizontal.

4. The accumulating roller conveyor set forth in claim 1, wherein said means for frictionally engaging said conveyor rollers is a continuous drive belt engaging the surfaces of said conveyor rollers disposed away from the articles being conveyed thereon.

5. The accumulating roller conveyor set forth in claim 4, and further including idler support rollers disposed beneath the reach of said belt engaging said conveyor rollers.

6. The accumulating roller conveyor set forth in claim 5, and further including adjustment cams supporting said idler support rollers to adjust the vertical positions thereof with respect to the associated conveyor rollers and thus the pressure applied to the associated conveyor rollers.

7. An accumulating roller conveyor for conveying articles comprising a frame, a plurality of conveyor rollers each including a cylindrical drive sleeve supported by a longitudinal shaft extending therethrough and rotatably supporting said drive sleeve thereon, means rotatably supporting each conveyor roller shaft on said frame with the axis of each conveyor roller shaft extending transversely of said frame and movable upwardly and rearwardly with respect to the direction of travel of the articles conveyed thereby, each of said conveyor roller shafts normally being positioned downwardly and forwardly with respect to said frame, means for frictionally engaging said conveyor roller sleeves for driving said conveyor rollers to convey articles supported thereon, when the movement of an article along said conveyor rollers is stopped the shafts of the contacted conveyor rollers move upwardly and rearwardly substantially to reduce the frictional engagement between said driving means and said conveyor roller sleeves contacting the stopped article, and one-way clutch mechanism engagable between each of said conveyor roller shafts and the associated conveyor roller sleeve to cause said shaft and said sleeve to rotate as a unit to hold out of contact with said driving means the conveyor rollers in contact with a stopped article in the upward and rearward positions thereof so long as the contacted article is stopped, forward movement of the stopped article disengaging the one-way clutch mechanism and permitting the contacted conveyor rollers to return to the downward and forward conveying positions thereof in full frictional engagement with said driving means.

8. The accumulating roller conveyor set forth in claim 7, wherein said means rotatably supporting each conveyor roller shaft comprises an opposed pair of slots in said frame, each of said slots having a surface inclined upwardly and rearwardly with respect to the direction of conveying of said conveyor.

9. The accumulating roller conveyor set forth in claim 8, wherein said upwardly and rearwardly inclined surfaces are inclined at an angle of about 5° with respect to the horizontal.

10. The accumulating roller conveyor set forth in claim 7, wherein said means for frictionally engaging said conveyor roller sleeves is a continuous drive belt engaging the surfaces of said conveyor roller sleeves disposed away from the articles being conveyed thereon.

11. An accumulating roller conveyor for conveying articles comprising a frame having a plurality of opposed pairs of slots therein, each of said slots having a support surface extending upwardly and rearwardly with respect to the direction of movement of articles on said conveyor, a plurality of conveyor rollers each having a cylindrical drive sleeve supported by a longitudinal shaft means extending therethrough and rotatably supporting said drive sleeve thereon, each of said shaft means being supported in an opposed pair of said slots and movable upwardly and rearwardly with respect to the direction of travel of the articles conveyed by said conveyor, each of said conveyor roller shaft means normally being positioned downwardly and forwardly within said slots and with respect to said frame, means for frictionally engaging said conveyor roller sleeves for driving said conveyor rollers to convey articles supported thereon, when the movement of an article along said conveyor rollers is stopped the shaft means of the contacted conveyor rollers move upwardly and rearwardly along said slots substantially to reduce the frictional engagement between said driving means and said conveyor roller sleeves contacting the stopped article, and one-way clutch mechanism interconnected between the shaft means and the sleeve of each conveyor roller to fix the sleeve with respect to the shaft means and to hold out of contact with said driving means the conveyor rollers in contact with a stopped article in the upward and rearward positions thereof so long as the contacted article is stopped, forward movement of the stopped article permitting disengagement of the one-way clutch mechanism to release the contacted conveyor roller sleeves from the associated shaft means and thus permitting the contacting conveyor rollers to return to the downward and forward conveying positions thereof in full frictional engagement with said driving means.

12. The accumulating roller conveyor set forth in claim 11, wherein the support surface of each of said slots is inclined at an angle of about 5° with respect to the horizontal.

13. The accumulating roller conveyor set forth in claim 11, and wherein said shaft means includes slide members disposed on each end of each shaft means and resting in an associated slot to accommodate smooth movement of the associated conveyor roller with respect to said frame.

14. The accumulating roller conveyor set forth in claim 11, wherein said one-way clutch mechanism includes a clutch member and a plurality of balls disposed within the associated sleeve, said clutch member having recesses receiving said balls out of contact with the associated sleeve and ramps directed outwardly toward the adjacent surface of the associated sleeve, whereby movement of said balls out of said recesses and along the ramps brings the balls into contact with the associated sleeve and locks the sleeve with respect to said clutch member and the shaft means connected thereto.

15. An accumulating roller conveyor for conveying articles comprising a frame, a plurality of conveyor rollers, means rotatably supporting each conveyor roller on said frame with the axis of each conveyor roller extending transversely of said frame and movable upwardly and rearwardly with respect to the direction of travel of the articles conveyed thereby, each of said conveyor rollers normally being positioned downwardly and forwardly with respect to said frame, a drive belt for frictionally engaging said conveyor rollers for driving said conveyor rollers to convey articles supported thereon, said drive belt having a projection thereon of limited longitudinal extent disposed toward said conveyor rollers, when the movement of an article along said conveyor rollers is stopped said projection moves the contacted conveyor rollers upwardly and rearwardly and out of contact with the remaining portions of said drive belt to remove engagement between said drive belt and said conveyor rollers contacting the stopped article except for said projection, and one-way clutch mechanism holding out of contact with said drive belt the conveyor rollers in contact with a stopped article in the upward and rearward positions thereof so long as the contacted article is stopped by preventing said rotatable support means from rotating relative to said stopped conveyor rollers forward movement of the stopped article permitting the contacting conveyor rollers to return to the downward and forward conveying positions thereof in frictional engagement with the surfaces of said drive belt including said projection.

16. The accumulating roller conveyor set forth in claim 15, wherein said projection has a longitudinal extent essentially equal to the longitudinal dimension of an article to be carried by said conveyor.

17. The accumulating roller conveyor set forth in claim 16, wherein a plurality of said projections are provided equidistantly spaced along said drive belt.

18. The accumulating roller conveyor set forth in claim 16, and further including idler support rollers disposed beneath the reach of said drive belt engaging said conveyor rollers.

19. The accumulating roller conveyor set forth in claim 18, and further including adjustment cams supporting said idler support rollers to adjust the vertical positions thereof with respect to the associated conveyor rollers and thus the pressure applied to the associated conveyor rollers.

20. An accumulating roller conveyor for conveying articles comprising a frame, a plurality of conveyor rollers each including a cylindrical drive sleeve supported by a longitudinal shaft extending therethrough and rotatably supporting said drive sleeve thereon, means rotatably supporting each conveyor roller shaft on said frame with the axis of each conveyor roller shaft extending transversely of said frame and movable upwardly and rearwardly with respect to the direction of travel of the articles conveyed thereby, each of said conveyor roller shafts normally being positioned downwardly and forwardly with respect to said frame, a drive belt for frictionally engaging said conveyor roller sleeves for driving said conveyor rollers to convey articles supported thereon, said drive belt having a projection thereon of limited longitudinal extent disposed toward said conveyor roller sleeves, when the movement of an article along said conveyor rollers is stopped said projection moves the contacted conveyor rollers upwardly and rearwardly and out of contact with the remaining portions of said drive belt to remove engagement between said drive belt and said conveyor roller sleeves contacting the stopped article except for said projection, and one-way clutch mechanism engagable between each of said conveyor roller shafts and the associated conveyor roller sleeve to cause said shaft and said sleeve to rotate as a unit to hold out of contact with said drive belt the conveyor rollers in contact with a stopped article in the upward and rearward positions thereof so long as the contacted article is stopped, forward movement of the stopped article disengaging the one-way clutch mechanism and permitting the contacted conveyor rollers to return to the downward and forward conveying positions thereof in frictional engagement with the surfaces of said drive belt including said projection.

21. The accumulating roller conveyor set forth in claim 20, wherein said means rotatably supporting each conveyor roller comprises an opposed pair of slots in said frame, each of said slots having a surface inclined upwardly and rearwardly with respect to the direction of the conveying of said conveyor, and each of said conveyor rollers having a shaft extending therefrom and into bearing engagement with the inclined surfaces of one of said pairs of slots.

22. The accumulating roller conveyor set forth in claim 21, wherein said upwardly and rearwardly inclined surfaces are inclined at an angle of about 5° with respect to the horizontal.

23. The accumulating roller conveyor set forth in claim 20, wherein said projection has a longitudinal extent essentially equal to the longitudinal dimension of an article to be carried by said conveyor.

24. The accumulating roller conveyor set forth in claim 20, wherein a plurality of said projections are provided equidistantly spaced along said drive belt.

25. An accumulating roller conveyor for conveying articles comprising a frame having a plurality of opposed pairs of slots therein, each of said slots having a support surface extending upwardly and rearwardly with respect to the direction of movement of articles on said conveyor, a plurality of conveyor rollers each having a cylindrical drive sleeve supported by a longitudinal shaft extending therethrough and rotatably supporting said drive sleeve thereon, each of said shafts being supported in an opposed pair of said slots and movable upwardly and rearwardly with respect to the direction of travel of the articles conveyed by said conveyor, each of said conveyor roller shafts normally being positioned downwardly and forwardly within said slots and with respect to said frame, a drive belt for frictionally engaging said conveyor roller sleeves for driving said conveyor rollers to convey articles supported thereon, said drive belt having a projection thereon of limited longitudinal extent disposed toward said conveyor roller sleeves, when the movement of an article along said conveyor rollers is stopped said projection moves the shafts of the contacted conveyor rollers upwardly and rearwardly and to move the surface of the contacted conveyor roller sleeves out of contact with the remaining portions of said drive belt to remove engagement between said drive belt and said conveyor roller sleeves contacting the stopped article except for said projection, and one-way clutch mechanism interconnected between the shaft and the sleeve of each conveyor roller to fix the sleeve with respect to the shaft and to hold out of contact with said drive belt the conveyor rollers in contact with a stopped article in the upward and rearward positions thereof so long as the contacted article is stopped, forward movement of the stopped article permitting disengagement of the one-way clutch mechanism to to release the contacted conveyor roller sleeves from the associated shafts and thus permitting the contacting conveyor rollers to return to the downward and forward conveying positions thereof in frictional engagement with the surfaces of said drive belt including said projection.

26. The accumulating roller conveyor set forth in claim 25, wherein the support surface of each of said slots is inclined at an angle of about 5° with respect to the horizontal.

27. The accumulating roller conveyor set forth in claim 25, and further including slide members disposed on each end of each shaft and resting in an associated slot to accommodate smooth movement of the associated conveyor roller with respect to said frame.

28. The accumulating roller conveyor set forth in claim 25, wherein said one-way clutch mechanism includes a clutch member and a plurality of balls disposed within the associated sleeve, said clutch member having recesses receiving said balls out of contact with the associated sleeve and ramps directed outwardly toward the adjacent surface of the associated sleeve, whereby movement of said balls out of said recesses and along the ramps brings the balls into contact with the associated sleeve and locks the sleeve with respect to said clutch member and the shaft connected thereto.

29. The accumulating roller conveyor set forth in claim 25, wherein said projection has a longitudinal extent essentially equal to the longitudinal dimension of an article to be carried by said conveyor.

30. The accumulating roller conveyor set forth in claim 25, wherein a plurality of said projections are provided equidistantly spaced along said drive belt.

* * * * *